No. 892,612. PATENTED JULY 7, 1908.
E. C. O'NEILL.
BRACKET FOR MIRRORS.
APPLICATION FILED MAR. 28, 1908.
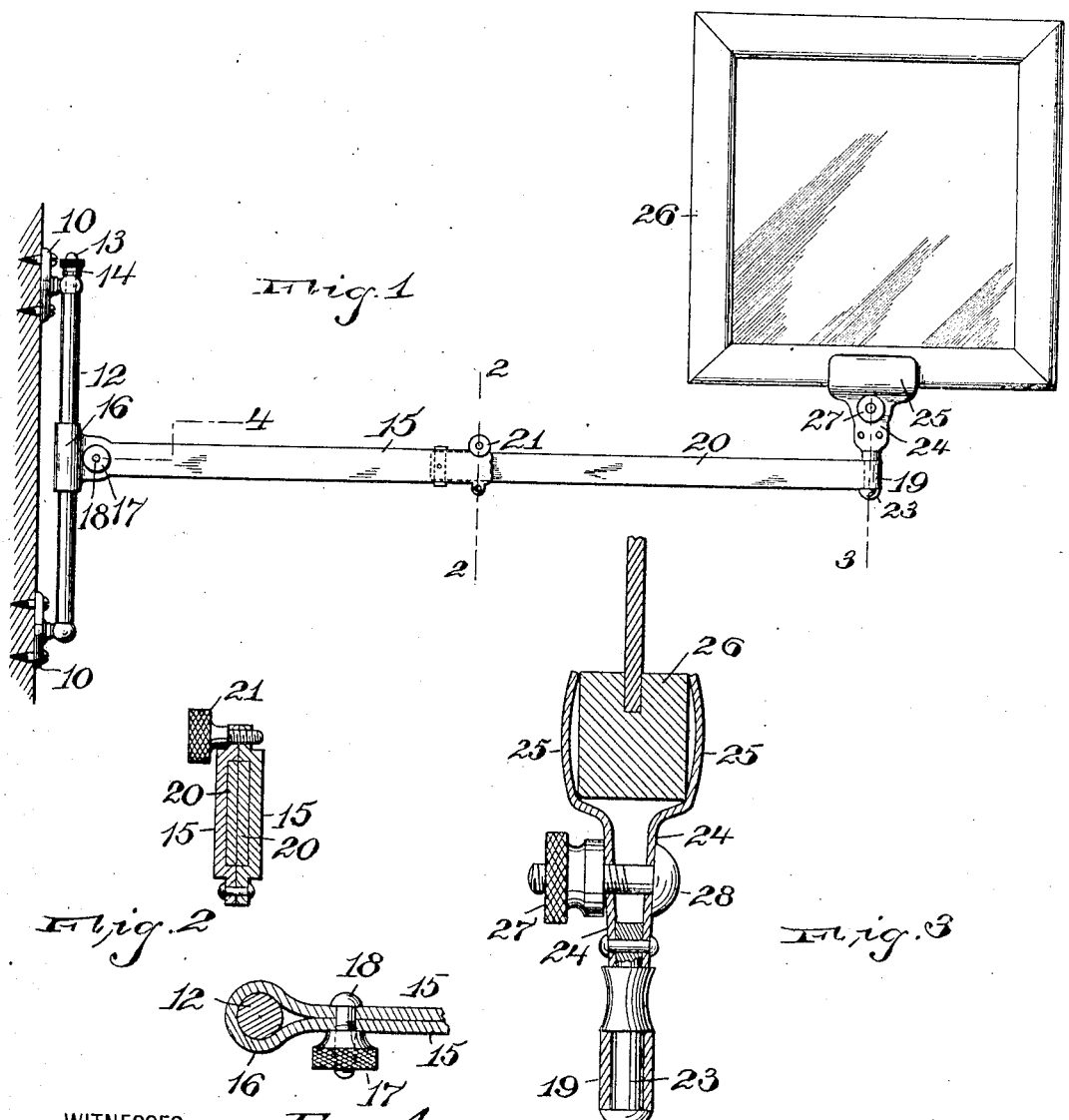

UNITED STATES PATENT OFFICE.

EDWARD C. O'NEILL, OF MONTCLAIR, NEW JERSEY.

BRACKET FOR MIRRORS.

No. 892,612.   Specification of Letters Patent.   Patented July 7, 1908.

Application filed March 28, 1908. Serial No. 423,835.

*To all whom it may concern:*

Be it known that I, EDWARD C. O'NEILL, a citizen of the United States, residing at Montclair, in the county of Essex and State of New Jersey, have invented certain new and useful Improvements in Brackets for Mirrors; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved bracket for a mirror for shaving or for other like uses, which bracket can be swung for better light and similar conditions, and which is also adjustable in length and also in height.

A further object of the invention is to provide a bracket of this kind with a clip mounted to rotate on the end of the bracket and adapted to hold and secure any form of mirror, whereby no special mirror for the bracket need be employed.

The invention is illustrated in the accompanying drawing, in which:

Figure 1 is a side view of the complete bracket. Fig. 2 is a section on line 2, 2, in Fig. 1. Fig. 3 is a section on line 3, in Fig. 1, and Fig. 4 is a section on line 4, in Fig. 1.

I use a pair of bearing-plates 10 suitably secured to a support 11, and these bearing-plates act to rotatably support the reduced ends of a post 12 whereby the post rotates to swing the bracket. To prevent rotation and lock the bracket in position, I lengthen the end 13 of the post 12 and provide it with a screw-thread on which fits the nut 14 which can be turned to bind on the bearing-plate adjacent to it hard enough to lock the post. A strip of metal is bent to form parallel strips 15, which act as an arm of the bracket, and is attached to the sleeve 16, which sleeve is adapted to slide on the rotatable post 12 and can be locked in place by the nut 17 binding on the post 18. Another strip of metal is bent to form a loop 19 and the parallel strands 20, which strands form the second member of the arm of the bracket and fit and are adapted to telescope into the arm 15. The strips making up the arm 15 can be bound to lock the strands of the second member against sliding by means of the screw 21 fitting in a flange 22 on each strip 15, thus also securing the ends of the strips. In the loop 19 is arranged a post or rivet 23 which has, secured thereto, the opposed spring arms 24 tending to spring apart. The arms 24 have the curved lips 25 which are so formed in order to permit the locking of a mirror in a tilted position, since the curved inner surface will allow the tilted adjustments. The mirror 26, shown in the illustration, can be of any form, and a mirror need not be supplied that is made particularly for the bracket. The clip is clamped shut by a nut 27 on a screw 28, as will be seen from Fig. 3.

The bracket is cheaply constructed and is ornamental, and combines a rotatable or swinging movement with a horizontal and vertical adjustment, and in addition a rotation of the mirror on the bracket.

Having thus described my invention, what I claim is:—

1. A bracket comprising bearing-plates, a vertical post rotatably arranged in the bearing-plates, the post projecting through one of the bearing-plates, a nut arranged to screw on the projecting end of the post to lock the same against rotation, an arm formed of two members, one member having a sleeve thereon arranged to embrace the post and having means for locking it in place, the sleeve being adapted to be unlocked to rotate on the post and also to slide thereon, a second member of the arm adapted to telescope into the first member, means for locking the two members in their adjusted positions, a clip on the end of the bracket and arranged to rotate thereon, the clip comprising spring arms and means for locking the spring arms together.

2. A bracket comprising bearing plates, a vertical post rotatably arranged in the bearing plates, means for locking the post in the bearing plates against rotation, an arm formed of two members, one member comprising a strip bent into a sleeve to embrace the post and then extending in parallel strips, means for locking the sleeve against rotation and longitudinal motion on the post, the second member formed of a strip bent into a loop on one end and then into parallel strips to telescope between the parallel strips of the first member, means for locking the two members in their adjusted positions, and a clip on the end of the second member arranged to hold a mirror.

3. A bracket comprising bearing plates, a vertical post rotatably arranged in the bearing plates, means for locking the post in the bearing plates against rotation, an arm formed of two members, one member comprising a strip bent into a sleeve to embrace the post and then extending in parallel strips, means for locking the sleeve against rotation and longitudinal motion on the post, the second member formed of a strip bent into a loop on one end and then into parallel strips to telescope between the parallel strips of the first member, means for locking the two members in their adjusted positions, a clip rotatably arranged in the loop on the end of the second member, spring arms on the clip having their opposed faces concave, and means for locking the spring arms together.

In testimony, that I claim the foregoing, I have hereunto set my hand this 27th day of March 1908.

EDWARD C. O'NEILL.

Witnesses:
WM. H. CAMFIELD,
E. A. PELL.